Figure 1:
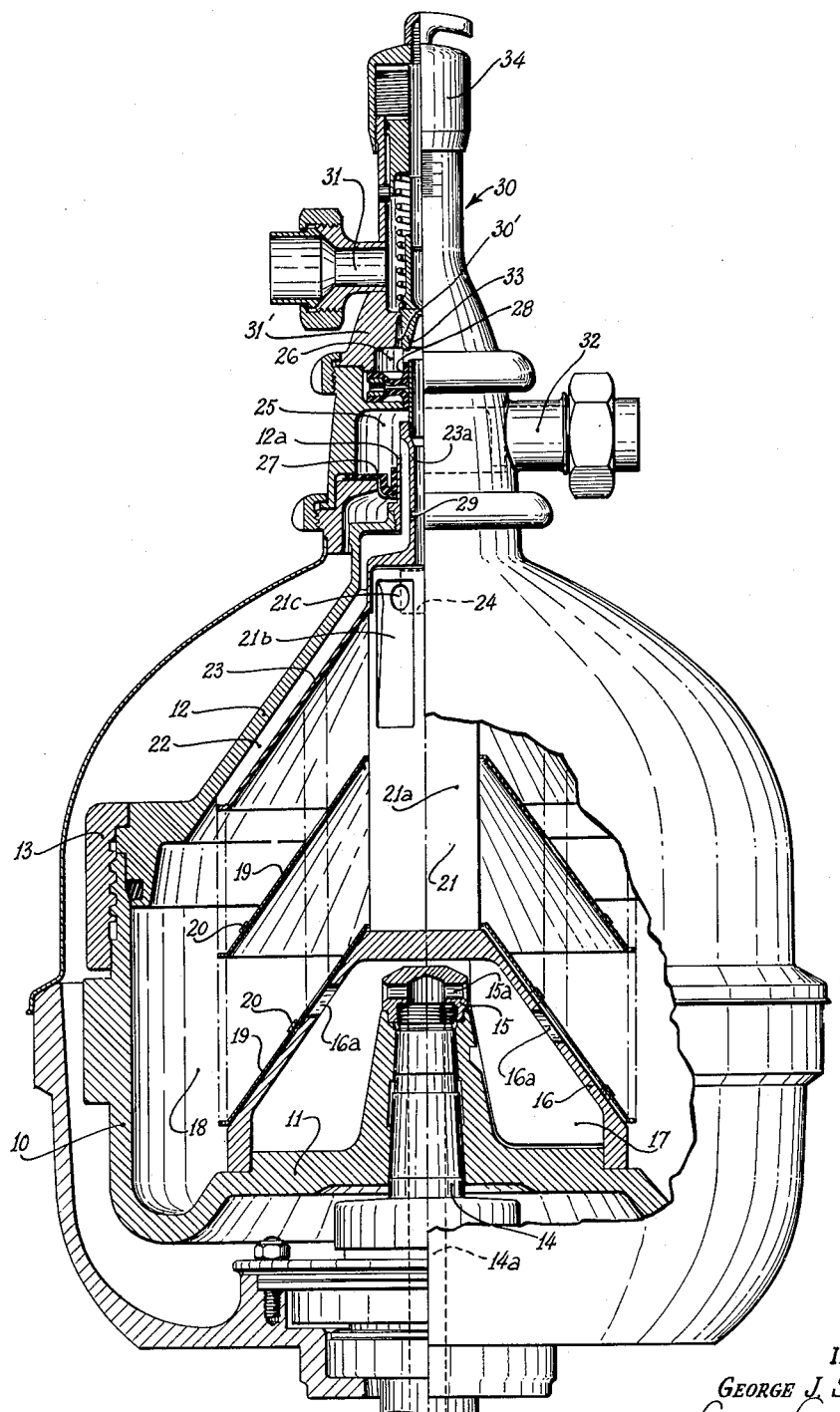

United States Patent Office 2,725,186
Patented Nov. 29, 1955

2,725,186

CENTRIFUGE FOR THE CLARIFICATION AND STANDARDIZATION OF MILK

George Julius Strezynski, Poughkeepsie, N. Y., assignor to The De Laval Separator Company, Poughkeepsie, N. Y., a corporation of New Jersey Application May 6, 1952, Serial No. 286,245

5 Claims. (Cl. 233—19)

This invention relates to centrifugal separators and more particularly to an improved centrifuge adapted especially to clarify whole milk and, at the same time, to standardize the fat content of the whole milk.

Most whole milk produced today for the fluid milk market contains 4% or more butter fat, while most state and local ordinances require that premium quality fluid market milk offered for sale contain not less than 3.5% butter fat. Since the producers of the whole milk are paid in accordance with the fat content of the milk, it is essential that the best profitable use be made of the butter fat content of the whole milk. It is mainly for this reason that the excess fat, over and beyond the legal requirements, is removed from the whole milk before it is sold on the fluid milk market. This practice of removing butter fat from the whole milk is known in the trade as "standardizing" the milk. As competition increases, standardizing becomes very important to a milk plant operator, because if the operator sells fluid market milk having a butter fat percent above the legal requirements, he is actually giving away such excess fat.

In the past, standardization of a given quantity of whole milk has been effected by first separating in a centrifugal bowl a portion of the whole milk into its skimmilk and cream components and then remixing a sufficient quantity of the separated skimmilk with the remaining whole milk in order to reduce the fat content of the latter to the minimum legal requirements. Thereafter, the blend is centrifugally clarified in accordance with accepted practice.

Centrifugal separators have been adapted to standardizing practices in the past, but they have functioned through a complete separation of all or a part of the whole milk into its skimmilk and cream portions and thereafter re-mixing (1) the separated skimmilk with the inflowing whole milk, or (2) a portion of the separated cream with the separated skimmilk. An example of the first of these alternatives is disclosed in the Hall Patent No. 2,214,831. The second alternative utilizes a by-pass valve arrangement provided between the discharge pipes of a regular cream separator. In either of these practices, the separated cream, which may represent 10% of the total flow through the centrifuge, does not receive adequate clarification. In the first of these alternatives, the lack of complete clarification of the cream is not too serious, since the separated cream is not re-mixed with the whole milk. However, in the second alternative, a serious difficulty is encountered in that the undesirable solids and leucocytes, which are entrained in or floated by the cream, are carried out of the separator in the separated cream and then returned into the skimmilk.

The present invention has for its main object the provision of an improved centrifugal separator for clarifying whole milk and, at the same time, standardizing the fat or cream content of the clarified whole milk before its discharge from the centrifugal bowl.

Another object of the invention is the provision of a whole milk clarifying and standardizing bowl within which that portion of the fat or cream constituent of the whole milk which is in excess of statutory requirements, is removed from the whole milk and separately discharged from within the bowl.

A further object of the invention is the provision of a centrifugal whole milk clarifying and standardizing bowl in which the fat or cream percent of that portion of the cream removed by the standardizing act performed within the bowl may be varied or changed without stopping the bowl and while the same is in operation.

In a whole milk centrifugal clarifying and standardizing bowl made according to the invention, the bowl chamber is provided with an inlet leading to a set of conical discs within the chamber, the discs being spaced apart to provide spaces within which the clarification of all the constituents of the whole milk and a separation of a portion of one of the constituents of the whole milk takes place. A fixed amount of the fat contained in the whole milk fed to the bowl, including that portion which is in excess of minimum legal limits, is separated out and concentrated within the disc spaces and, being the relatively light constituent, is displaced inwardly from within the disc spaces toward the bowl axis, while the remainder of the whole milk passes outwardly from between the discs and is discharged from within the bowl through a separate outlet. Preferably, the discs surround a tubular shaft forming a plurality of channels which gradually enlarge or flare in cross-sectional area from the base portion of the shaft to its top portion, each channel thus forming an upwardly enlarging discharge passage for leading the separated cream from within the bowl chamber to an outlet. This cream outlet is of the valved orifice type. The centrifuge is provided with sealing means forming a substantially air-tight path from the bowl chamber to the valved orifice and through which the separated cream is discharged. Thus, by adjusting the valve at the cream discharge orifice, the pressure on the discharging cream in advance of the orifice may be varied, for a purpose to be described presently.

In the preferred construction, the tubular shaft has generally flat lateral faces, each of which carries a gradually deepening recess partly defining a cream discharge passage leading toward the cream outlet orifice. The corners of the adjacent flat lateral faces may be used for locating the conical discs through which the tubular shaft extends, the discs being formed with notches adapted to receive the shaft corners.

A top disc having an upwardly extending neck piece is arranged at the top of the disc stack in the usual manner in centrifugal bowl construction. The neck piece surrounds the upper end of the tubular shaft and defines an axial cream passage leading from the flaring cream passages in the tubular shaft and preferably connecting them through an air-tight seal with a stationary cream pipe containing the valved discharge orifice. The bowl top, at its uppermost portion, has a neck piece which surrounds the top disc neck and forms therewith a vertical passage (herein referred to as the skimmilk passage) for the discharge of the heavy constituent from within the bowl. This skimmilk passage communicates through one or more bleed ports with part of the sealed cream discharge passage located in advance of its valved discharge orifice. By means of these ports and the back pressure valve at the cream discharge orifice, a bleeding of separated cream into the partially skimmed milk is obtained, the rate of such bleeding being determined by the setting of the valve at the cream discharge orifice. In this way, the fat content of the discharged heavy constituent may be brought to the desired percentage.

The mode of operation of the clarifying and standardizing bowl according to this invention is based upon effecting a partial separation of a small percent, say up to 2% of the fat content of the whole milk fed to the bowl, and thereafter returning a controlled amount of this separated fat to, and mixing the same with, the discharging, partially skimmed whole milk. In this way, all of the standardized milk discharged from the machine has been completely clarified. The partially separated whole milk is subjected to the same amount of centrifugal force as is customary in centrifugal clarifier bowls, and the separated cream, due to its relatively small volume, is held within the bowl in a zone of lesser centrifugal force for a considerable time. No portion of the whole milk fed to the bowl is completely separated into its fat and skimmilk constituents.

Figure 2:
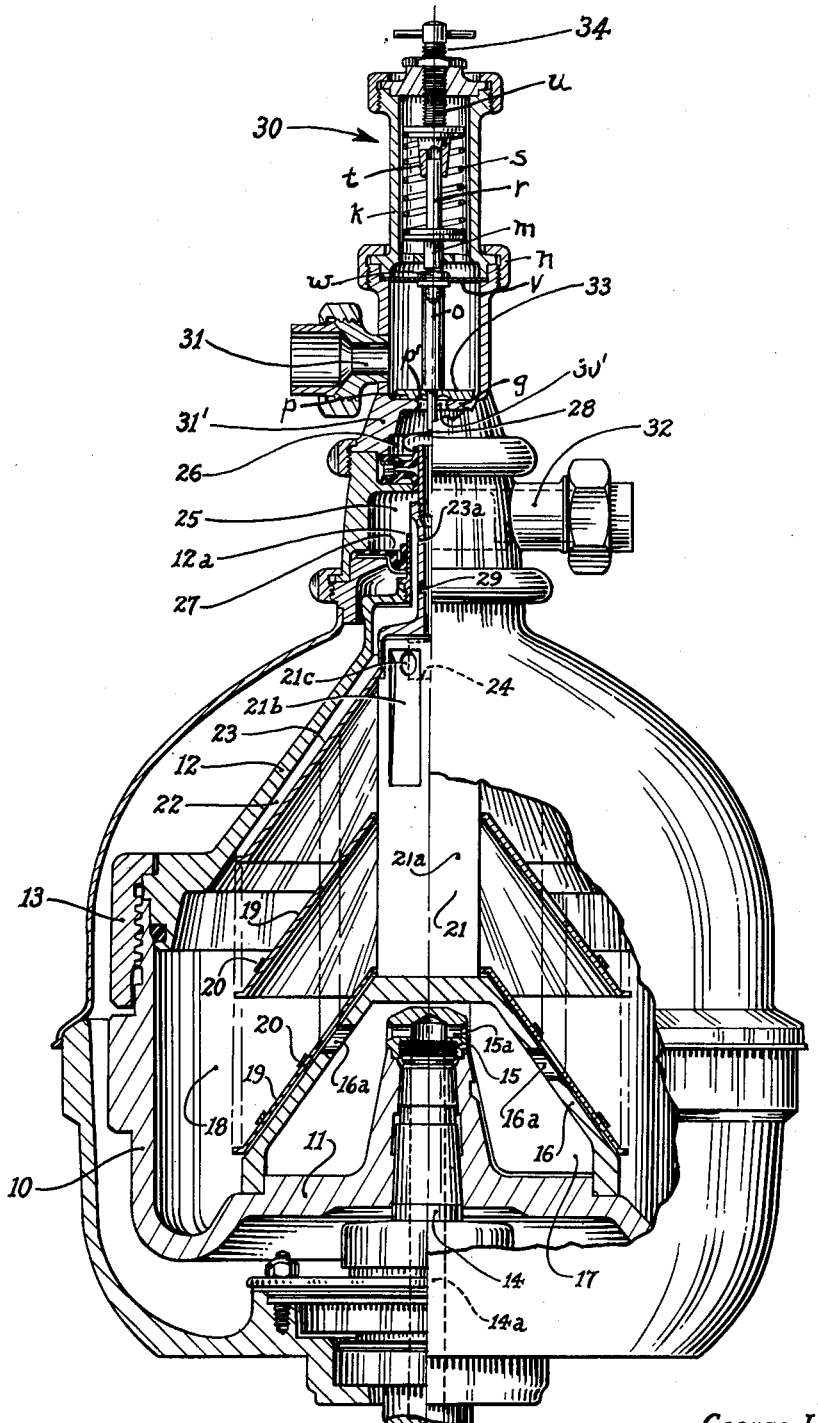

For a better understanding of the invention, reference may be had to the accompanying drawing, in which Fig. 1 is a vertical sectional view of a preferred form of centrifugal separator embodying the invention, and Fig. 2 is a view similar to Fig. 1 but showing details of a conventional adjustable throttling device through which the cream is discharged.

In the drawing, the bowl shell 10 has a bottom 11 and a top 12. The bottom is formed integral with the shell and the top is secured thereto by a threaded ring 13. The bowl is mounted for rotation on and driven by a spindle 14 having a passage 14a therethrough by means of which the whole milk to be clarified and standardized is delivered into the bowl. The spindle projects upwardly through the bottom of the bowl and has a nut 15 threaded thereon to secure the bowl to the spindle. Radial passages 15a in the nut 15 serve to connect the spindle passage 14a with the interior of the bowl.

A nave 16 is mounted centrally in the bowl on the bottom thereof. The undersurface of the nave 16 and that portion of the bowl bottom 11 covered thereby define a feed chamber 17 into which the whole milk is fed via the spindle passage 14a and the radial passages 15a in nut 15. The conical wall of nave 16 is provided with a plurality of holes 16a extending through the wall and forming inlet openings for feeding the whole milk into the bowl chamber 18. The holes 16a may be at different radii from the center of the bowl or they all may be at the same radii. In any event, the holes are located approximately at the neutral zone between the cream or fat constituent and the skimmilk constituent of the whole milk undergoing separation in the chamber 18. The exact location of the neutral zone may be readily calculated with the use of a formula well known in the centrifugal art.

In the embodiment shown, the holes 16a are located at two different radii, the smaller radius being equivalent to the calculated neutral zone when hot (90° F.–92° F.) whole milk is fed to the bowl, and the larger radius being equivalent to the neutral zone location when cold (40° F.–50° F.) whole milk is fed to the bowl.

The clarifying and standardizing chamber 18 of the bowl is provided with a stack of conical discs 19 supported on the upper side of the nave 16. The discs are spaced apart by means of caulks or spacers 20, and the clarification and partial separation of the whole milk is effected within the spaces so formed between the discs. The discs are provided with holes in alignment with the holes 16a in the nave 16, which permit the whole milk entering the chamber 18 via the nave holes 16a to pass into the spaces between the discs. That portion of the fat or cream which is separated out between the discs, being the lighter component, moves inwardly toward a tubular shaft 21 affixed on top of the nave 16. During its inward movement, the cream is concentrated. The remainder of the whole milk, being the heavier component, moves outwardly to the peripheral portion of chamber 18 and thence upwardly to a passage 22 formed between the underside of the bowl top 12 and the upper side of a top disc 23.

The tubular shaft 21 is secured to the top of nave 16 and centered on the rotation axis of the bowl, and it extends upwardly from the nave through circular central openings in the discs 19. It has been found preferable, especially when cold milk is fed to the bowl chamber, to form the tubular shaft with a plurality of lateral recesses 21a, each of which contains a gradually deepening recess 21b for a considerable portion of its length, the recess being deepest near the top of the tubular shaft. Thus, the circular central openings of the discs 19 and the lateral and partially recessed faces 21a of the tubular shaft define a gradually enlarging channel for conveying the separated light constituent from within the bowl chamber. Such construction is particularly advantageous in the handling of cold (40°–50° F.) milk since, at such temperatures, the viscosity of the separated cream constituent is quite high and, unless channels of adequate size are present, the flow of cream may be stopped due to plugging in the passages.

The top of the tubular shaft 21 is provided with a central internal recess 24 which is connected with the deepest part of the recesses 21b by holes 21c. The corners of the adjacent lateral faces 21a are utilized for locating the discs 19 of the disc stack. To this end, each disc 19 is provided with notches adjacent its central opening, which receive the corners on the tubular shaft 21 formed at the intersection of the lateral faces thereon.

Concentric neck pieces 12a and 23a of the bowl top 12 and the top disc 23, respectively, form continuations of the partially skimmed milk and cream discharge passages 22 and 24, respectively, through which these constituents are separately conducted from within the bowl chamber 18 to discharge chambers 25 and 26, respectively. These discharge chambers are made air-tight and sealed from each other by the use of rubber seals 27 and 28 in a manner well known in centrifugal art.

The standardizing of the clarified and partly skimmed whole milk discharging through passage 22 is accomplished through a plurality of small ducts or ports 29, say $3/32''$ diameter, in the wall of the top disc neck 23a, by inducing a back pressure on the discharging cream. In this way, some of the cream is forced through the ducts 29 and mixes with the partially skimmed milk in the passages 22 and is further mixed therewith in the chamber 25. A convenient means in the form of a throttling device for inducing a variable amount of back pressure on the cream constituent discharging from the bowl chamber 18 is shown generally at 30, the same being particularly described in Hapgood Patent No. 2,145,544, issued January 31, 1939. It comprises essentially a stationary cream pipe 31' partly defining the discharge chamber 26 and a cream discharge orifice 30', a spring-loaded valve 33 controlling the cream flow through the orifice to a discharge pipe 31, and an adjustment nut 34 for varying the spring loading of the valve and therefore the back pressure on the cream.

In the operation of the centrifuge, whole milk which is to be clarified and standardized is fed through the spindle passage 14a and the nut passages 15a into the feed chamber 17. The milk then rises through the holes 16a in the top of chamber 17, and the corresponding holes in each disc 19 of the disc stack, and flows into the spaces between the discs in chamber 18.

In the chamber 18, the whole milk is partially separated into its skimmilk and cream constituents. This partial separation is governed by two factors, the first being that the mantle length of the discs 19 is too short to provide a length of outward travel of the heavy constituent to the periphery of the discs sufficient to effect a complete separation of all of the light constituent. The second factor is that the feed input rate to the bowl chamber is in excess of a feed input rate which would permit complete separation of the constituents of the feed. In other words, in a centrifuge according to this invention, the length of the disc mantle is shortened and the feed input rate increased to the point where only a partial separation of the whole milk feed may be obtained when the bowl is operated within the normal speed range, say 6000 to 8000 R. P. M.

That part of the fat or cream separated from the whole milk in the disc spaces, being the light constituent, passes inwardly through the disc spaces to the cream outlet passages surrounding the tubular shaft 21. Since the volume of separated cream increases (its concentration increases also) as it moves upwardly along the faces 21a of the tubular shaft, additional area is provided by the recesses 21b, which lead to the holes 21c through which the cream passes to the central recess 24 and its continuation defined by the top-disc neck piece 23a. The separated and concentrated cream passes through the hollow interior of neck piece 23a into the sealed stationary space 26, and thence through the orifice 30' of valve 30 and into the cream discharge pipe 31. The rate of discharge of the cream from chamber 26 is regulated by valve 30, which also serves to keep a back pressure on the separated cream stream.

The partially skimmed portion of the whole milk within the disc spaces, being the heavier constituent, passes outwardly through the disc spaces into the peripheral portion of chamber 18. During this travel, the heavier constituent, from which a portion of the fat content has been separated, is subjected to sufficient centrifugal force to effect a clarification thereof in the well known manner. The heavy constituent, on reaching the peripheral portion of the bowl, flows upwardly to and through channel 22 and its continuation formed between the concentric bowl top and top-disc neck pieces 12a and 23a, into chamber 25, from which it discharges via stationary pipe 32.

In a clarifying and standardizing bowl made according to the invention, the bleed ducts 29 have a total through-flow capacity sufficient to accommodate the entire cream separating capacity of the bowl. Thus, by entirely closing the valve 30 through adjustment of nut 34, all of the separated cream is returned to the clarified whole milk stream in chamber 25 and the bowl functions only as a clarifier. When it is desired to reduce the overall cream or fat content of the feed stream, that is, "standardize" the milk discharging from chamber 25 via pipe 32, the valve 30 is slightly opened, thereby reducing the back pressure on the separated cream in chamber 26. Accordingly, only part of the separated cream passes through ducts 29 to mix with the whole milk in chamber 25, while the remainder of the separated cream passes from chamber 26 through the slightly opened orifice 30' and discharges through pipe 31.

Since the through-flow capacity of ducts 29 is at least equivalent to the cream separating capacity of the bowl, the opening or closing of valve 30 has no appreciable effect on the amount of cream or fat separated within chamber 18 of the bowl, nor does it appreciably control the concentration of the separated fat. Thus, the opening or closing of the valve 30 serves only to vary the amount of separated cream which is caused to flow through the ducts 29 into the clarified whole milk stream.

For example, assume that whole milk having a fat content of 4.5% is fed into a clarifying and standardizing bowl according to the invention having a separating chamber of 340 mm. diameter and 40° angle discs with a mantle length of 140 mm., and operated at 6000 R. P. M. with a 20,000 lbs./hr. feed rate. Within the bowl chamber 18, not more than 2% of the cream content of the milk is separated out and passes from the chamber 18 via the top disc neck piece 23a. By only partially opening the valve 30, a sufficient amount of separated cream is forced through ducts 29 to make the total fat content of the clarified milk stream 3.5%, or in other words, to "standardize" the outflowing milk stream at the minimum legal limit.

The mechanical design of the bowl is such that, at a fixed throughput rate of 20,000 lbs./hr., it will separate within close percentage limits a relatively small amount of the fat content of the whole milk and concentrate the separated fat to 38%–42% if the feed stream is cold (40°–50° F.), or to 55%–65% if the feed stream is hot (90°–92° F.). Thus, the only factors which require consideration with regard to the setting of valve 30 in any particular installation are the back pressures developed in the pipes 31 and 32 incident to the particular installation. These may be determined readily through the use of test gauges, so that by a proper setting of valve 30 a drop in pressure is effected across the ports or bleed ducts 29 from the central cream passage to the partially skimmed milk passages 22. Should the back pressures on the two discharging streams be equal, no cream would be returned to the discharging whole milk stream. On the other hand, if the valve 30 should be held closed, all of the cream would be returned to the whole milk stream. Between these limits, any degree of standardization of the whole milk may be accomplished.

With regard to the clarification of the partially skimmed milk stream, it will be obvious that the manner in which it passes through a centrifugal bowl according to the invention is the equivalent of well known practice in centrifugal clarifying art. In regard to the separated cream stream, it is pointed out that the cream stream, while not subjected to the maximum centrifugal force developed within the bowl as is the case with the whole milk stream, is subjected to centrifugal force for a considerable period of time while the cream is being concentrated and before it is discharged from within the top disc neck. Experience has shown that the cream stream separated in a bowl constructed according to the invention is clarified at least to the same extent and in most cases to a better extent than cream treated in ordinary centrifugal cream clarifiers operating at normal throughput rates, not only in the removal of foreign bodies such as dirt and hair but also in the removal of leucocytes, the removal of the latter being one of the prime reasons for centrifugal milk clarification over and beyond straining and/or filtering practices.

It will be understood that the described combination centrifugal clarifier and standardizer bowl does not effect a complete separation of the whole milk feed stream into its fat and skimmilk constituents but rather only a partial separation of a small percent of the total fat content of the feed stream. The combination bowl according to the invention thereafter effects an individual clarification of the component stream comprising the remainder of the whole milk and the separated cream component stream. Thus all of the feed stream may be said to be clarified. The final remixing of the individually clarified streams or parts thereof results in a completely clarified and standardized whole milk, which end result has not been attainable with the use of prior "standardizing" centrifuges.

With the use of a combination type of centrifuge according to the invention, "standardization" within the limits of 0.1% fat content of the discharged whole milk stream may be accomplished. This is due to the fact that the bowl is mechanically designed to separate and remove only a small proportion of the fat content of the whole milk feed stream, and the only control which may be exercised in conjunction with the fixed separation factor of the bowl in a regulation of that proportion of the originally separated fat or cream to be returned to the whole milk discharge stream at a point beyond the separating chamber of the bowl but within the confines of the bowl proper.

The arrangement of the bleed ducts 29 in the rotating parts of the bowl promotes homogenization and mixing of the cream returned to the discharging milk stream. In other words these ports, in the arrangement described, serve the dual functions of standardizing the milk, in conjunction with the variable back pressure on the separated cream in chamber 26, and homogenizing the milk as it is standardized.

A further advantage of a combination bowl according to the invention resides in its inherent ability to produce a clarified concentrated cream or fat suitable for other dairy uses from the surplus fat content of the whole milk, that is, the fat content over and beyond minimum legal requirements, of the whole milk feed stream.

As previously mentioned, the throttling device 30 for inducing a variable back pressure on the discharging cream constituent may take the form shown in said Hapgood Patent No. 2,145,544. In Fig. 2, I have illustrated the details of the throttling device 30 as disclosed in said patent, the reference letters in Fig. 2 designating the same parts as in Fig. 1 of the Hapgood patent. Referring to Fig. 2, the adjustable throttling device 30 comprises a cage $k$ mounted upon the cylinder or pipe 31' and held in position by means of a nut $n$. Within cage $k$ is a spring $s$ which rests upon the head of a pin $m$ whose shank extends through and is vertically slidable in the bottom wall of the cage $k$. Pin $m$ engages a screw $w$ threaded in the upper end of a valve stem $o$ which extends downward through the center of cylinder 31' and has a reduced lower end which extends through a central orifice 30' in valve seat $g$ of valve 33. The annular shoulder at the upper end of the reduced lower end portion of valve stem $o$ overlies a valve disc $p$ of valve 33 and presses it against seat valve $g$.

Extending upward from pin $m$ is a guiding member $r$ which slidably engages a guiding member $t$ between the head of which and the head of pin $m$ spring $s$ is confined. By means of a manually adjustable screw $u$ threaded in the upper wall of cage $k$, the pressure of the spring is adjusted, thereby adjusting the pressure of valve disc $p$ against valve seat $g$.

Across the upper end of cylinder 31' extends a diaphragm $v$, the peripheral portion of which is confined between the upper end of cylinder 31' and the lower end of cage $k$. The central portion of the diaphragm is confined between the head of screw $w$ and the upper end of valve stem $o$.

The central orifice 30' in valve seat $g$ has a convex wall and the lower side of valve disc $p$ is provided with a concavity $p'$ which overlies orifice 30' and constrains cream to flow smoothly through orifice 30' before its entrance between valve seat $g$ and valve disc $p$.

By adjusting the screw $u$ the pressure of valve disc $p$ upon valve seat $g$ may be regulated to vary the fluid pressure required to force cream between the valve members and thence through the discharge pipe 31. The greater the pressure of the spring, the greater the resistance to flow of cream and the more concentrated the cream.

I claim:

1. A combination clarifying-standardizing centrifuge for milk, and the like, which comprises a rotary centrifugal bowl having a separating chamber for partially separating cream from the milk and concentrating the cream, the bowl also having a whole milk inlet leading into the chamber, a concentrated cream outlet passage leading from the chamber near the bowl axis, and a partially skimmed milk outlet passage leading from the chamber near the outer periphery thereof, a throttling device forming an outlet from the cream outlet passage and imposing in said cream passage a back pressure greater than the pressure in the other outlet passage, and means rotating with the centrifugal bowl and forming a bleed duct connecting said outlet passages and located in advance of the throttling device, reckoned in the direction of flow of the cream, whereby separated cream is forced through the duct means into said milk outlet passage.

2. A centrifuge according to claim 1, comprising also an adjustment member connected to the throttling device for varying said back pressure and therefore the rate of cream flow through the bleed duct means.

3. A centrifuge according to claim 1, comprising also an adjustment member connected to the throttling device for varying said back pressure and therefore the rate of cream flow through the bleed duct means, the bleed duct means being dimensioned to accommodate the flow of all the separated cream flowing through the cream passage, upon complete throttling of the cream passage by said throttling device.

4. A centrifuge according to claim 1, comprising also a stack of spaced conical discs in the separating chamber and into which the whole milk inlet leads, the discs extending outward from said inlet for a distance insufficient to effect complete separation of the cream from the milk passing outwardly between the discs to said milk outlet passage.

5. A combination clarifying-standardizing centrifuge for milk, and the like, which comprises a rotary centrifugal bowl having a separating chamber for partially separating cream from the milk and concentrating the cream, the bowl also having a whole milk inlet leading into the chamber, a concentrated cream outlet passage leading from the chamber near the bowl axis, and a partially skimmed milk outlet passage leading from the chamber near the outer periphery thereof, the bowl having a bottom and a top, the top including a hollow neck-piece, a stack of spaced apart discs supported centrally within the chamber by the bowl bottom, a top disc also having a hollow neck-piece being arranged centrally within the bowl top neck-piece and extending therethrough, the interior of the top disc neck-piece defining said cream outlet passage, the exterior of the top disc neck-piece and the interior of the bowl top neck-piece defining said milk outlet passage, a duct leading through the top disc neck-piece and interconnecting said outlet passages, and a throttling device controlling the rate of flow through the cream outlet passage and located beyond the duct reckoned in the direction of cream flow from within the chamber.

References Cited in the file of this patent

UNITED STATES PATENTS

| 2,145,544 | Hapgood | Jan. 31, 1939 |
| 2,214,831 | Hall | Sept. 17, 1940 |
| 2,344,888 | Lindgren | Mar. 21, 1944 |

FOREIGN PATENTS

| 691,386 | Germany | May 24, 1940 |